United States Patent
Meriçli et al.

(10) Patent No.: US 12,319,284 B2
(45) Date of Patent: Jun. 3, 2025

(54) PLATOON BEHAVIORS THAT INFLUENCE DRIVERS OF OTHER VEHICLES

(71) Applicant: Stack AV Co., Mount Pleasant, PA (US)

(72) Inventors: Tekin Alp Meriçli, Pittsburgh, PA (US); Alonzo James Kelly, Edgeworth, PA (US)

(73) Assignee: Stack AV Co., Mount Pleasant, PA (US)

( * ) Notice: Subject to any disclaimer, the term of this patent is extended or adjusted under 35 U.S.C. 154(b) by 209 days.

(21) Appl. No.: 18/078,357

(22) Filed: Dec. 9, 2022

(65) Prior Publication Data

US 2023/0322218 A1   Oct. 12, 2023

Related U.S. Application Data

(60) Provisional application No. 63/288,717, filed on Dec. 13, 2021.

(51) Int. Cl.
| | |
|---|---|
| *B60W 30/14* | (2006.01) |
| *B60W 30/165* | (2020.01) |
| *B60W 30/18* | (2012.01) |
| *B60W 40/04* | (2006.01) |

(52) U.S. Cl.
CPC ........ *B60W 30/143* (2013.01); *B60W 30/165* (2013.01); *B60W 30/18163* (2013.01); *B60W 40/04* (2013.01); *B60W 2554/4046* (2020.02); *B60W 2554/802* (2020.02); *B60W 2554/804* (2020.02)

(58) Field of Classification Search
CPC ............. B60W 30/143; B60W 30/165; B60W 30/18163; B60W 40/04
See application file for complete search history.

(56) References Cited

U.S. PATENT DOCUMENTS

| | | | |
|---|---|---|---|
| 6,032,097 A | 2/2000 | Iihoshi et al. | |
| 2014/0136414 A1* | 5/2014 | Abhyanker | G06Q 20/3224 701/25 |
| 2017/0069203 A1* | 3/2017 | Sharma | G08G 1/07 |
| 2019/0012919 A1* | 1/2019 | Brandriff | B60W 30/165 |
| 2020/0401160 A1 | 12/2020 | Lacaze | |
| 2021/0129844 A1 | 5/2021 | George et al. | |
| 2022/0198936 A1 | 6/2022 | Meriçli et al. | |

FOREIGN PATENT DOCUMENTS

| | | |
|---|---|---|
| CN | 112644491 A | 4/2021 |
| DE | 102012020713 A1 | 4/2014 |

(Continued)

OTHER PUBLICATIONS

Guo et al. "Self-defensive Coordinated Maneuvering of an Intelligent Vehicle Platoon in Mixed Traffic," 15th International IEEE Conference on Intelligent Transportation Systems, Anchorage, Alaska, USA, Sep. 16-19, 2012; pp. 1726-1733.

(Continued)

*Primary Examiner* — Seth A Silverman
(74) *Attorney, Agent, or Firm* — Morrison & Foerster LLP

(57) ABSTRACT

Methods and apparatus for platoon behaviors that discourage other vehicles from interfering.

15 Claims, 16 Drawing Sheets

V1 approaches gap at a velocity that suggests intent to interfere or risk of interference. Centroid of gap (identified by dot) has similar velocity.

Gap velocity relative to V1 is reduced. This happens at the point in time when V1 is "near the gap"

(56) References Cited

FOREIGN PATENT DOCUMENTS

| WO | 2016/134770 A1 | 9/2016 |
| WO | WO-2019089749 A1 * | 5/2019 |

OTHER PUBLICATIONS

International Search Report and Written Opinion mailed Apr. 18, 2023, directed to International Application No. PCT/US2022/052355; 9 pages.
Soni et al. (Nov. 2018). "Formation Control for a Fleet of Autonomous Ground Vehicles: A Survey," Robotics 7 (67): pp. 1-25.

* cited by examiner

V1 approaches gap at a velocity that suggests intent to interfere or risk of interference. Centroid of gap (identified by dot) has similar velocity.

Gap velocity relative to V1 is reduced. This happens at the point in time when V1 is "near the gap"

V1 moves past the gap quickly based on its higher speed.

Gap velocity can be increased once threat of interference is passed.

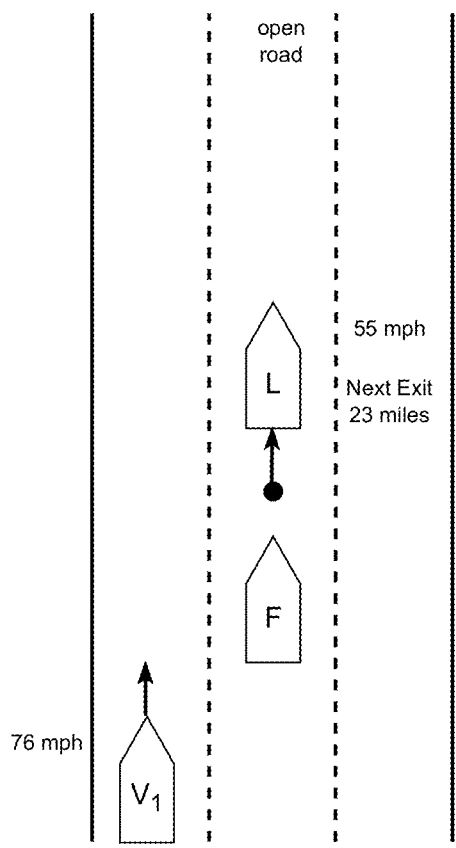
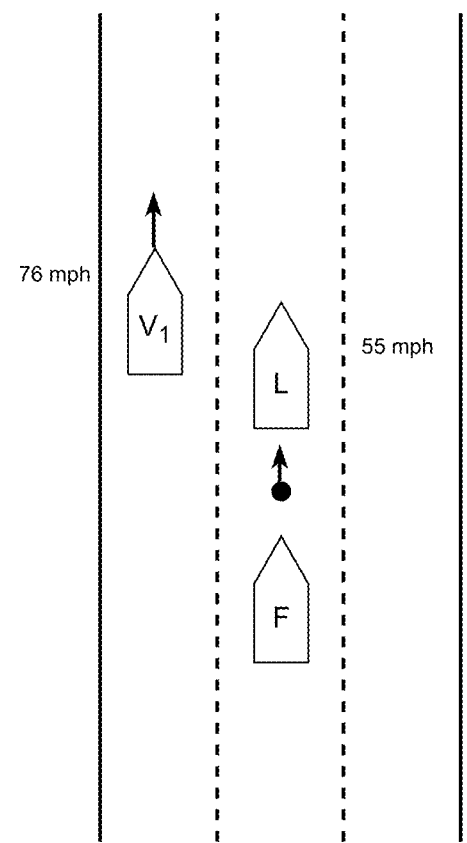
FIG. 2A      FIG. 2B
V1 approaching rapidly in left lane; little or no traffic ahead; no
nearby exit or entrance ramps - do not adjust gap speed

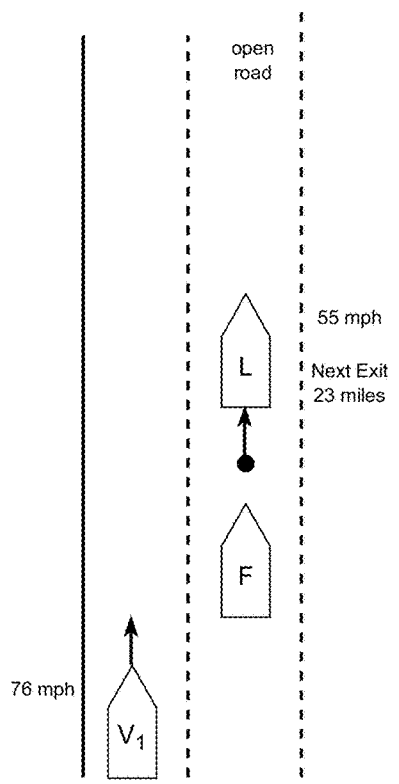
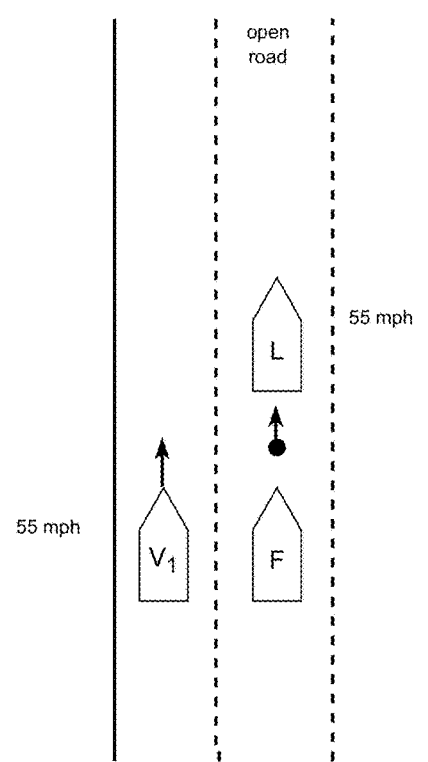
FIG. 3A  FIG. 3B
V1 initially approaching rapidly in left lane; little or no traffic ahead; V1 slows to match platoon speed with respect to road; no other apparent reason to slow; platoon adjusts to slower gap speed with respect to the road; at 3D may take still other action (pull into breakdown lane, etc.)
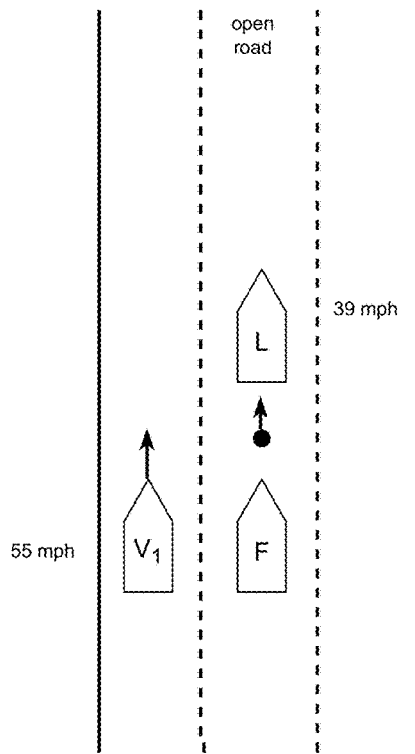
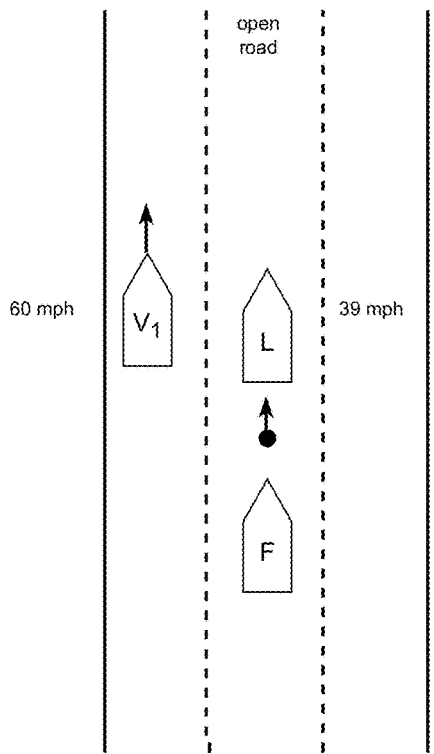
FIG. 3C  FIG. 3D

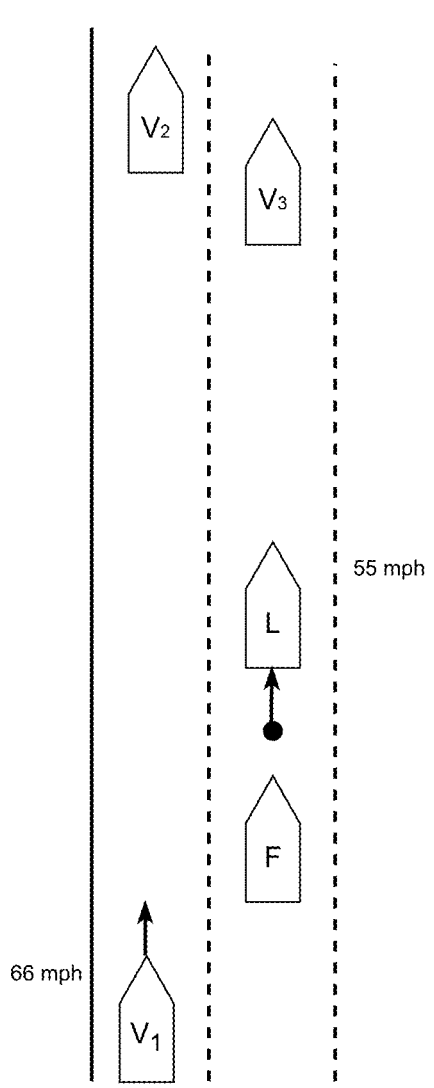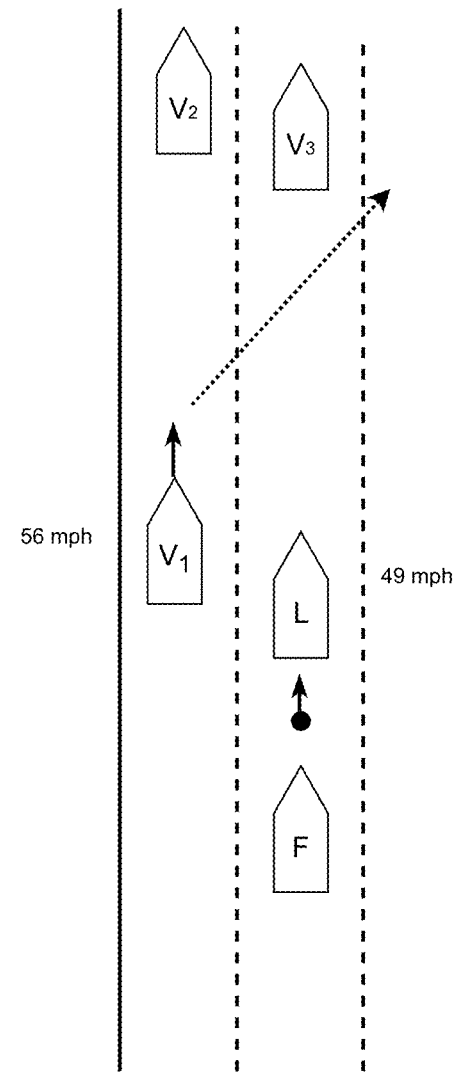
FIG. 4A                    FIG. 4B
V1 approaching in left lane; congestion ahead but right lane "clear"; reduce gap speed with respect to the road ; encourages overtaking V1 approaching in left lane with turn signal on; exit ramp ahead; open gap to encourage cut in.

Platoon approaches on ramp with entering vehicle V1; gap velocity relative to V1 is increased; platoon moves to center lane if not already there.

A vehicle who has cut-in is encouraged to vacate the space between platooning vehicles, such as by L and F moving to the right lane and / or slowing down to increase cadence Platoon shifts back and forth in lane to discourage tailgating V1 initially approaching in left lane; V1 slows to match platoon speed with respect to road; no other apparent reason to slow; platoon adjusts by placing another lane between it and V1; at 10D platoon changes lanes and slows down V1 initially approaching in left lane; V1 slows to match platoon speed with respect to road; no other apparent reason to slow; platoon adjusts by increasing speed to place V2 parallel or near the gap (ideally near enough to discourage V1 without encouraging V2 to intrude;

V1 initially approaching in left lane; V1 slows to match platoon speed with respect to road; no other apparent reason to slow; platoon adjusts by increasing speed briefly and changing lanes to place V1 behind it; at 11D platoon decreases speed to place V1 ahead of it V1 approaching in left lane and has already matched its speed to platoon; platoon adjusts by nudging toward V1 in order to discourage intrusion V1 approaching in left lane and has already matched its speed to platoon; platoon adjusts by nudging away from V1 in order to discourage intrusion

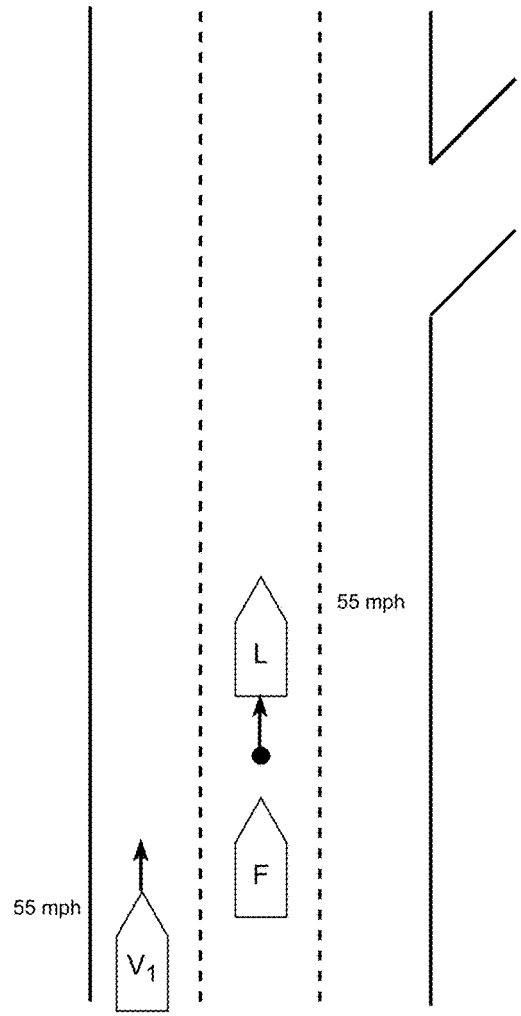
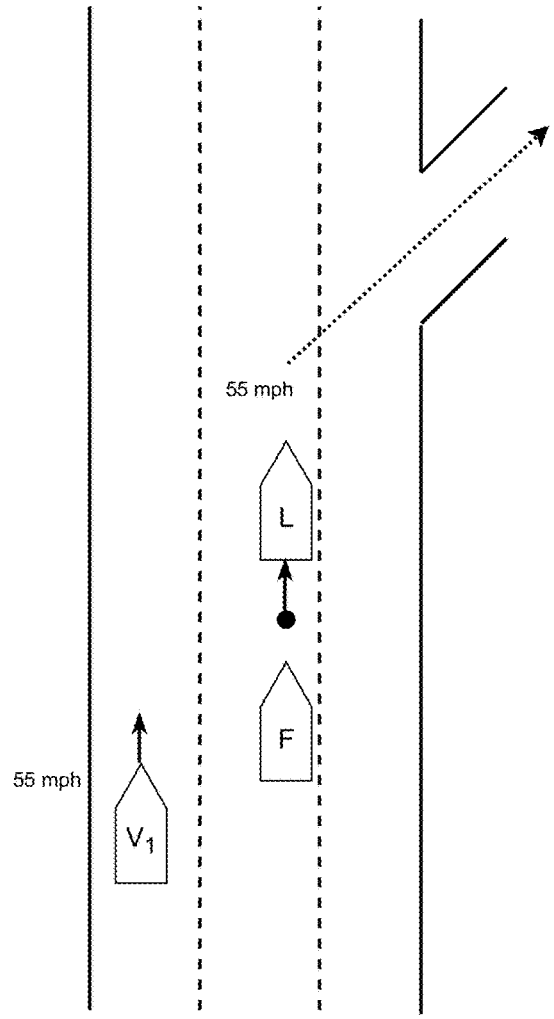
FIG. 14A  FIG. 14B
V1 approaching in left lane and has already matched its speed
to platoon; platoon adjusts by nudging away from V1 in order to
suggest intent to exit and thereby discourage intrusion

PLATOON BEHAVIORS THAT INFLUENCE DRIVERS OF OTHER VEHICLES

CROSS REFERENCE TO RELATED APPLICATION(S)

This patent application claims priority to a co-pending U.S. Patent Provisional Application entitled "PLATOON BEHAVIORS THAT INFLUENCE DRIVERS OF OTHER VEHICLES" Ser. No. 63/288,717 filed on Dec. 13, 2021, the entire contents of which are hereby incorporated by reference.

BACKGROUND

This patent application relates to methods and apparatus used by platooning vehicles to influence the behavior of other drivers who are not part of the platoon.

Researchers and vehicle manufacturers have been developing self-driving technologies for many years. Commercial trucking continues to be one of the areas where autonomous vehicles will eventually become widespread. In one scenario, the truck at the front of a convoy remains under human control, with one or more trailing vehicles autonomously following the leader, or each other. Sensors and/or wireless connections (such as vehicle-to-vehicle radio communication) keep the trucks aware of each other's position and condition, to enable the autonomous follower(s) to respond to changes in the leader's direction and speed.

U.S. Pat. No. 6,032,097 to Iihoshi (Honda) describes a system where a platoon of controlled motor vehicles are running on a road. Motion information of a target motor vehicle is transmitted to other motor vehicles through intervehicular communications. Each of the following motor vehicles controls itself to run in platoon based on the transmitted motion information.

International Patent Publication WO2016134770A1 (Volvo Truck Corporation) describes methods of controlling inter-vehicle gap(s) in a platoon between a lead vehicle and one or more following vehicles. A small time gap is enabled by using vehicle-to-vehicle (V2V) communication and automation of longitudinal control. Normally, the lead vehicle in the platoon strives to maintain a target speed and the vehicles behind in the platoon aim to copy the longitudinal control with the additional constraint to maintain a time gap to the vehicle in front.

Soni, et. al, in "Formation Control for a Fleet of Autonomous Ground Vehicles: A Survey", Robotics, 2018, 7, 67 mentions various benefits of vehicle formation control such as improved safety, fuel efficiency, mileage, and time needed to travel and reduced road congestion. It is observed that autonomous vehicles must stay in the lanes and follow nearby vehicles by maintaining safe distance and velocity.

U.S. Patent Publication US2020/0401160A1 involves a system for convoying autonomous vehicles that changes the separation distances (or "gaps") between autonomous vehicles depending on the behavior of the surrounding autonomous vehicles. Sensors allows each vehicle to sense its environments, other vehicles, their position, and their velocities and a control system. The location of the surrounding autonomous vehicles is used to adjust the convoy gap distance.

In Guo "Self-defensive Coordinated Maneuvering of an Intelligent Vehicle Platoon in Mixed Traffic" 2012 15th International IEEE Conference on Intelligent Transportation Systems Anchorage, Alaska, USA, Sep. 16-19, 2012, pp. 1726-1733, autonomous vehicles are equipped with onboard sensors, such as vision and Lidar sensors, to detect objects of interest, including the road infrastructures such as lanes, traffic signs, and other road participants such as the surrounding vehicles. When a human-driven vehicle interferes with the platoon by changing lanes through the platoon, the platoon detects this event and maneuvers actively to keep the platoon away from the human-driven vehicle.

SUMMARY OF PREFERRED EMBODIMENTS

A platoon formation might want to influence behavior of "ex-formation" motorists/vehicles who are not part of the platoon. Doing so may enhance safety by actually preventing accidents. Or it may reduce risk by avoiding exceptional circumstances that require dangerous or counterproductive convoy maneuvers (like pulling to the shoulder).

Those other ex-formation motorists/vehicles might be inclined to accommodate the platoon formation or, occasionally, to interfere with it. Or they may simply have their own motives (like crossing one or more lanes to reach an exit) that happen to conflict with maintaining the formation.

Of interest here are techniques for influencing the behavior of other motorists so they are less likely to interfere with platooning vehicles. These may include engaging in maneuvers or taking actions such as adjusting the velocity of a reference within the gap with respect to the velocity of other vehicles;

forcing a vehicle who has cut-in to vacate the space between platooning vehicles;

discourage tailgating; or other maneuvers to convey the state of the platoon vehicles Engaging in one or more of these behaviors may depend on current conditions, such as the state of other traffic ahead of the platoon, the platoon's distance to the next on-ramp or exit-ramp, and other conditions.

More generally, the approach is to respond to traffic by changing attributes of the velocity of the gap between the platoon vehicles, the lateral position of the platoon in its lane, or other conditions, for the purpose of influencing the behavior of other nearby vehicles.

For example, the driver of an ex-formation vehicle (i.e. "another" vehicle) attempting occupy the space (the "gap") between two platooning has several concerns, including both the size of the gap and the magnitude of the relative velocity of the gap (herein the relative speed of the gap) and the other vehicle. In other words, the driver of the other vehicle may be concerned with both whether the other vehicle will fit easily into the gap and whether the other vehicle's velocity can be matched to the velocity of the gap. During some aggressive maneuvers, it may even be important to null the relative acceleration of the gap, but the following discussion will emphasize the relative velocity of the gap and the other vehicle.

Rather than merely close (or open) the gap, it is more effective to maintain the gap size and instead adjust the velocity of the gap with respect to the other (i.e. ex-formation) nearby vehicles. This is accomplished by coordinating the velocity of both platooning vehicles relative to the road in order to thereby adjust the present or future speed of the gap relative to other vehicles.

The velocity of the gap can be determined as the velocity of a reference point on the back of a leading platoon vehicle, a reference point on the front of a following platoon vehicle, or some reference point within the gap between the leading and following platoon vehicle. Because the velocity of such a reference point relative to the other vehicle could be positive or negative relative to the forward direction of the lane, we also define "cadence" herein as the magnitude of that relative velocity (also known as its speed). Also, herein subsequent references to "speed" or "velocity" refer to speed or velocity relative to the road unless otherwise indicated. Increasing cadence can therefore mean speeding up or slowing down of either the gap or the other vehicle, depending on the circumstances. When the velocity of the other vehicle and the gap are matched, the cadence is zero.

The platoon behavior logic may be informed of potential interference such as via inputs from a driver or other human in of one of the vehicles. The platoon behavior logic can also be informed of a potential or actual interference state via perception logic. The platoon behavior logic can also be predictive about the likelihood of potential interference depending on automatically detected current conditions, enabling the platoon to respond even before a potentially interfering other vehicle gets into position near the platoon.

For example, increasing the cadence (such as either slowing down or speeding up the gap relative to the other vehicle) may be imposed only when another driver slows to match the speed of the platoon, or the platoon is approaching an exit ramp or on ramp, or when traffic ahead appears to be slowing, or other situations where it is typical of other drivers to try to cut-in between the platoon vehicles.

In another situation, when the platoon is travelling on an open road with little traffic, it can be predicted that a rapidly approaching vehicle who has occupied a passing lane for a while is unlikely to change lanes and enter the gap. In that situation, the cadence is not changed.

In still other situations, the other vehicle may approach the platoon and then slow down to match the platoon's speed. It can be predicted that the vehicle may attempt to enter the gap and thus the cadence is increased accordingly to discourage cutting-in. In this case, because the other vehicle is slowing down, the platoon gap will speed up in order to increase the cadence.

Or if the other vehicle is observed driving erratically, or weaving in and out of traffic, or racing one or more still other vehicles as it approaches the platoon, it can be predicted that a cut-in might be attempted. Again an increase in the cadence can be implemented to discourage that behavior.

BRIEF DESCRIPTION OF THE DRAWINGS

Additional novel features and advantages of the approaches discussed herein are evident from the text that follows and the accompanying drawings, where:

FIGS. 1A to 1D illustrate increasing velocity of a gap relative to another vehicle to discourage cut-in.

FIGS. 2A to 2B illustrate maintaining the gap speed with open road ahead and rapidly approaching vehicle.

FIGS. 3A to 3D illustrate slowing the gap when the other vehicle appears to slow even though there is open road ahead.

FIGS. 4A to 4B illustrate slowing the gap when congestion is detected ahead to discourage cut-in.

FIGS. 14A and 14B are an example where the other vehicle has matched its speed to the platoon, with the platoon then nudging away in lane to discourage intrusion.

DETAILED DESCRIPTION OF ILLUSTRATIVE EMBODIMENT(S)

Figure 1A:
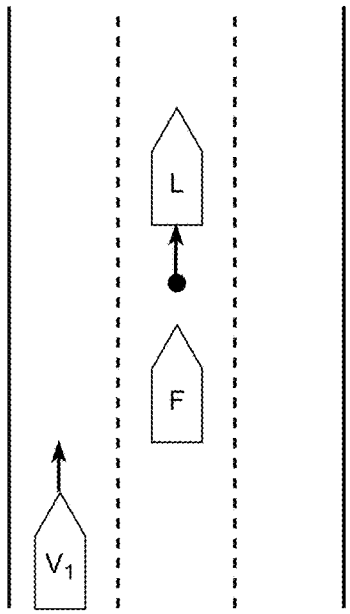

Turning attention to FIG. 1A, in one example situation a follower vehicle (designated with the letter "F") is following the same path 104 along the ground as a leader vehicle (designated with the letter "L"). The leader L and F are referred to as platooning vehicles.

The leader L and follower F can each be a vehicle such as a semi-truck that includes a tractor and a fifth wheel on which the kingpin of a trailer is coupled. In some implementations, a truck can be following a car, or vice versa, or a car may be following a car. In some of the embodiments described herein, the leader L and follower F are following one another closely, and thus can be said to form a "platoon". However, the methods, apparatus and systems described herein also apply more generally to vehicles travelling in formation, or other types of convoying vehicles travelling together. Electronics located in the tractor and/or trailer of either or both vehicles L and or F include one or more sensors, communications interfaces, autonomous controllers, and interfaces to a physical drive system. As will be explained in more detail below, the sensors may include vision sensors such as cameras, radars, sonars, LIDARs, motion sensors such as odometers, speedometers, gyroscopes, and other sensors. In an example case where the leader L and follower F are semi-trucks, at least some of the vision sensors may have fields of view that include region(s) in front of the semi-truck, other vision sensors may have fields of view that include side regions extending laterally from each side of the tractor or of any attached trailer, and still other vision sensors may point downward to view lane markings, pavement edges, or other indications of the lateral extent of a road surface and/or the region that constitutes the intended lane of travel.

Electronics in the leader L and/or follower F may also include one or more computers that process data received from the sensors, use perception logic to determine one or more conditions, such as potential interference by other vehicles that are not part of the platoon, and then execute autonomous planner logic depending on those conditions. The potential interfering condition may also be determined by a human such as a driver or passenger of the leader L or follower F who then provides an input to the system.

The planner logic in turn drives control logic that operates the mechanical components of the drive system. The drive system includes at least acceleration (or throttle), braking, and steering mechanisms that respond to electrical control inputs provided by the control logic. The control logic may directly use motion sensors such as odometers and gyroscopes to measure the motion of the vehicle.

It is also possible, however, that at least one vehicle, such as the leader L, is driven at least partially by a human driver.

1. Reducing the Velocity of the Gap Relative to Other Vehicles

Continuing to refer to FIG. 1A, as a follower F is following a path traversed by leader L, the two vehicles are said to form a platoon. Autonomy logic in one or both of the vehicles control the spacing or physical gap between the leader L and follower F (for example, what an automatic cruise control might do, often referred to as longitudinal control). Vehicle convoys often impose a gap constraint, or a minimum distance or time between leader L and follower F during normal operation.

The follower F is also following the same path as the leader L. The leader's path 104 may be determined in several ways. The path that the leader is following may be a set of GPS coordinates transmitted by the leader to the follower over a V2V or other wireless interface. However, the leader's path 104 can also be determined by the follower F without input from the leader, such as by using cameras and image processing to periodically determine the leader's position. Based on such information, control logic in the follower F may be interested to determine any combination of the position of the leader L relative to itself in a) lateral or b) longitudinal directions, or c) the lateral position of the leader L with respect to the lane markings near the leader's wheels.

The follower F may be interested to determine its own position with respect to the lane markings near its own wheels. Such position can be detected by vision sensors located anywhere on the follower F that can see the lane markings or pavement edges (or other indicia of a lane location) on the road ahead, behind, or to the side of the follower. This process of using sensors to continuously determine the position of an object which is in view of those sensors can be sensor-based positional tracking.

Lane markings may consist of painted solid or dashed lines on the road surface or any other physical or otherwise detectable feature that permits a measurement of lateral position on the road surface. Such features may include the edge of the pavement, jersey barriers, traffic cones, guard rails etc. When the need is extreme, such as when the road is covered with snow, lateral position can also be derived from the vehicles in adjacent lanes, either to avoid collision or to simply assume that their motion amounts to a partial definition of their lane. Another extreme example is deriving lateral position from tire tracks in the snow before the road has been cleared by a snowplow.

In general, the follower F uses the sensor inputs to control its own position so that it attempts to remain in the same lane as the leader L, observing the same lane discipline as the leader L and maintaining a stated gap distance.

The leader L is driven by a human or, in other instances, can be a fully autonomous vehicle executing robust self driving algorithms (e.g., SAE Level 4 or 5 autonomy). There may be economic value in having the leader L be human-driven, and there is potential safety and functional value in having most or all of the electronics on the follower F duplicated on the leader L. In one scenario, the leader L includes a full autonomy suite of sensors and reports what it is perceiving to the follower F autonomy system.

In the illustrated scenario, the leader L and follower F begin in the center lane, as shown in FIG. 1A, and with a gap G between them. Potentially interfering vehicle V1 has been detected and reported by the human driver or passenger of the leader L, or autonomy logic, or some combination of both. The potentially interfering vehicle V1 is slowly approaching the platoon from an adjacent leftmost lane. As the leader L and/or follower F detect the approaching vehicle (and signal the same to their platoon companion), the autonomy logic in leader L and/or follower F take steps to temporarily change the relative velocity (e.g., relative speed) of the gap G with respect to the vehicle V1.

The velocity of the gap can be determined as the velocity of a predetermined point such as some point on the rear of leader L, or a point on the front of follower F, or some other point within the space between leader L and follower F. In the drawings such as FIG. 1A, this predetermined point is shown as a black dot with an arrow.

Because the velocity of such a reference point relative to the other vehicle V1 could be positive or negative relative to the forward direction of the lane, we also define "cadence" herein as the magnitude of that difference in velocity. When the cadence is zero, the other vehicle V1 and the gap G are travelling at the same velocity. When the cadence has some non-zero value, there is a difference between the velocity of vehicle V1 and the velocity of gap G.

Figure 1B:
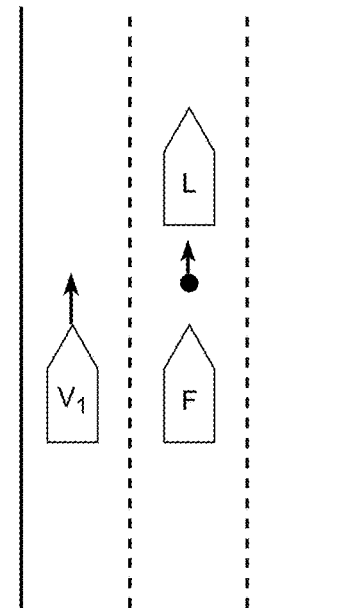

Temporarily increasing the magnitude of the relative velocity (and hence increasing the cadence) can be accomplished by the leader L and follower F reaching the state shown in FIG. 1B. This state occurs at some point in time when V1 has moved close to the gap and appears able to enter the gap. Each platoon vehicle L and F has now slowed down in a coordinated manner while still maintaining the same gap distance between them. For example, they may have slowed down by several miles per hour to discourage the other vehicle V1 from attempting to enter the gap G. The velocity of the gap G relative to the vehicle V1 has therefore also been changed, but the relative size of the gap G with respect to both F and L may not be changed. More generally, slowing down the gap may lead to a smaller gap size being desirable. Therefore, the cadence may be an independently controlled variable and/or gap size may be a dependent consequence, but gap size not the main point of the maneuver.

Figure 1C:
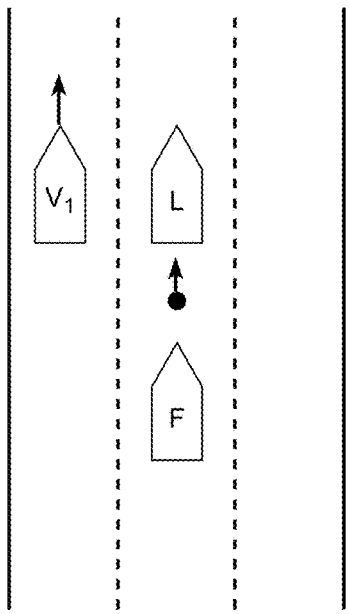

As can be seen in FIG. 1C, this change in the cadence has indeed influenced V1 to continue travelling in the left most lane without attempting to enter the gap G. Leader L and follower F have in this instance, managed to maintain the same gap spacing G between them. However in other instances, it should be understood that the gap spacing may also have decreased.

Figure 1D:
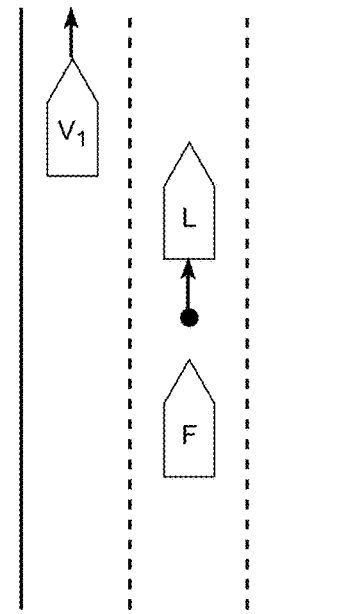

Finally, as in FIG. 1D, with V1 having passed the platoon, the leader L and follower F can resume their desired velocity again.

More generally, and for all adjustments of the gap between vehicles, the change can be accomplished by any combinations of acceleration and deceleration of individual vehicles that have the desired effect but these options may differ in terms of rapidity, feasibility, safety, fuel consumption, or other attributes. They may also differ in the resulting motion of the convoy as a whole, defined in terms of the motion of its center of mass or area etc.

2. Maintaining Gap Velocity with Open Road Ahead

FIGS. 2A to 2B illustrate maintaining the gap velocity with an open road ahead and rapidly approaching vehicle. In this example the other potentially interfering vehicle V1 is observed by a human or detected by the autonomy logic as approaching rapidly in the left lane such as at 76 mph. The platoon vehicles L and F are traveling much slower at 55 mph in the center lane. The next exit is quite a distance away (23 miles) so there is no apparent reason for the other vehicle V1 to cut in or otherwise interfere with the platoon. Thus platoon vehicles leader L and follower F maintain their velocity and so too is the relative velocity of the gap maintained. The other vehicle V1 simply continues in the left lane and passes by the platoon.

3. Slowing the Gap with Open Road Ahead

FIGS. 3A to 3D illustrate slowing the gap when the other vehicle V1 appears to slow even though there is open road ahead.

At the point shown in FIG. 3A, V1 is initially approaching rapidly in the left lane again at 76 mph with little or no traffic ahead, and with the next exit quite some distance away. At FIG. 3B V1 has slowed to match the platoon speed with respect to the road such that the cadence is now near zero. Given that there is no other apparent reason for vehicle V1 to slow down, the platoon logic therefore decides to slow the gap speed with respect to the road in FIG. 3C such as to 39 mph. At this point the driver of V1 decides not to bother with the platoon, speeds back up and continues along its path in the left lane.

4. Slowing the Gap when Congestion Detected Ahead

FIGS. 4A to 4B illustrate slowing the gap when congestion is detected ahead to encourage overtaking.

In FIG. 4A the platoon, traveling in the center lane at 55 mph, detects upcoming congestion in the form of slower vehicles V2 and V3 in the left and center lanes. The rightmost lane is empty, suggesting that rapidly approaching vehicle V1 may attempt to pass through the gap in order to move to the right lane. At FIG. 4B, the platoon logic has slowed the gap to 49 mph relative to V1's 56 mph, leaving sufficient space ahead of the platoon for V1 to overtake the platoon and enter the rightmost lane.

A similar scenario may occur when an emergency vehicle is detected ahead of or behind the platoon.

5. Opening the Gap when Approaching Exit Ramp

Figure 5A:
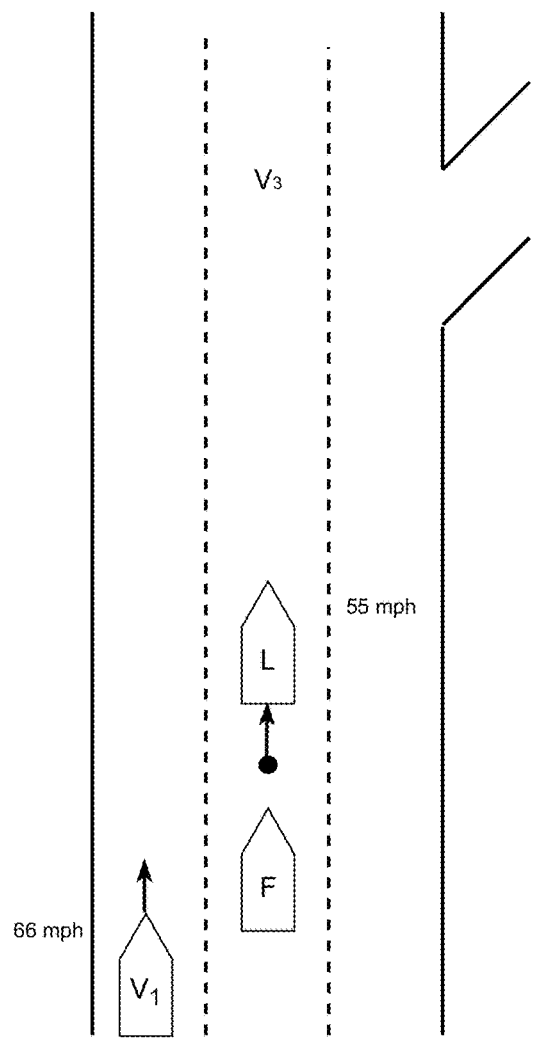
FIGS. 5A to 5B illustrate opening the gap and optionally slowing the gap when an exit ramp is ahead and the other vehicle appears to want to take the exit.
Figure 5B:
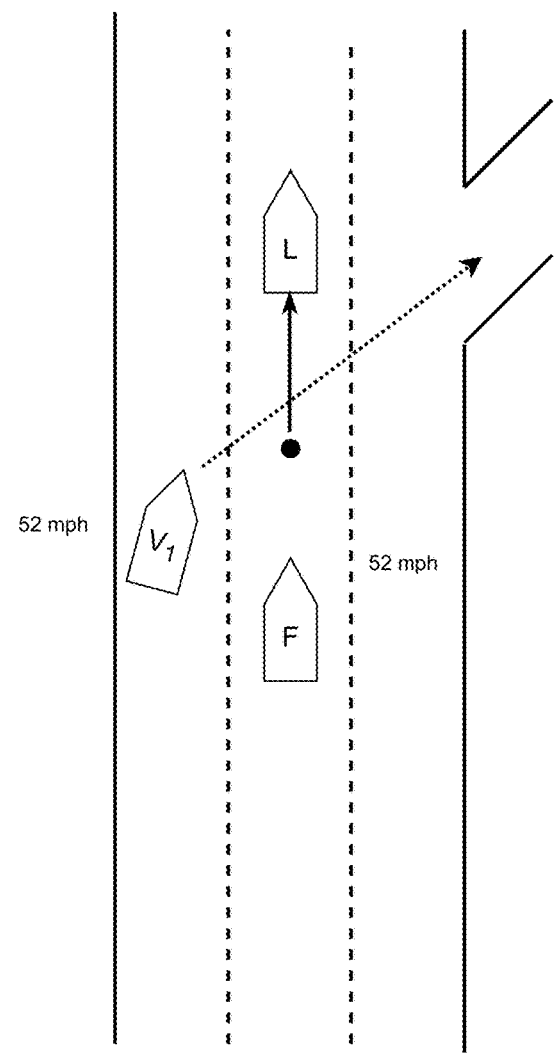

FIGS. 5A to 5B illustrate slowing the gap and optionally opening the gap when an exit ramp is ahead and the other vehicle appears to want to take the exit.

In FIG. 5A, V1 is travelling in the left lane at relatively high speed and with an exit ramp ahead. The platoon is again in the center lane traveling at 55 mph. The presence of the exit ramp ahead suggests that V1 may be planning to exit the highway. At this point the platoon can take several possible actions. A first action (not shown here but similar to what was shown in FIG. 4B), is to slow the gap say to 49 mph relative to vehicle V1's 66 mph, encouraging V1 to overtake the platoon before the exit ramp. However another possible action, as shown in 5B, is to open the gap and optionally also match the speed of V1 to thereby enable and thus encourage vehicle V1 to pass through the gap in order to make the exit.

6. Slowing the Gap and/or Changing Lanes when Approaching Entrance Ramp

Figure 6A:
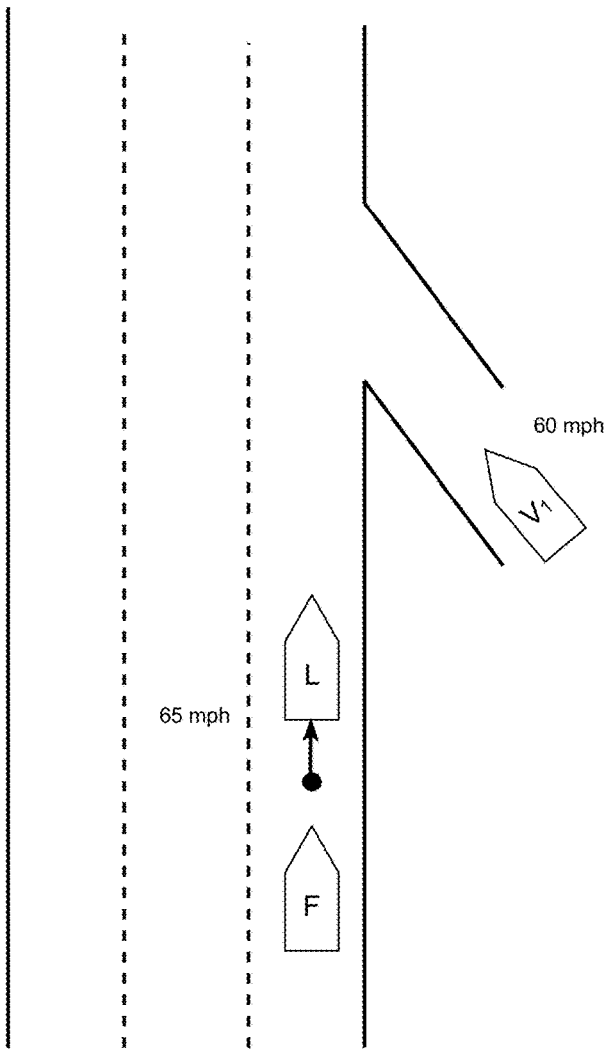
FIG. 6A to 6B illustrate slowing the gap when approaching vehicles are entering the highway.
Figure 6B:
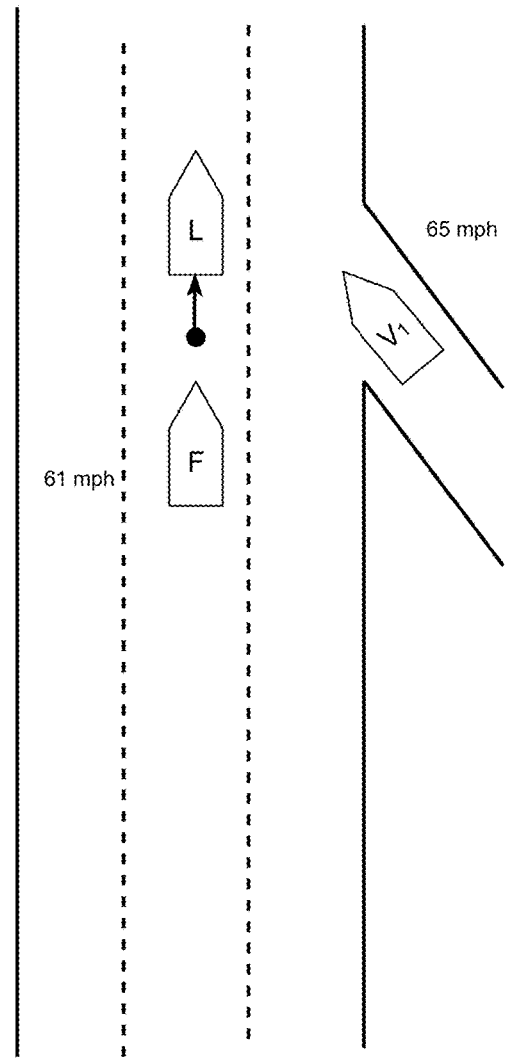

FIG. 6A to 6B illustrate slowing the gap relative to other vehicles are entering the highway.

In this scenario shown in FIG. 6A, the platoon is initially traveling at 65 miles an hour in the rightmost lane. A highway entrance ramp is ahead with another vehicle V1 entering the highway at 60 mph. Here the gap velocity relative to the road is reduced to 61 mph as vehicle V1 enters the highway at 65 mph. This encourages vehicle V1 to simply enter the highway ahead of vehicle L without interfering with the operation of the platoon. In FIG. 6B, the platoon also vacates the lane adjacent to the entrance ramp in order to further discourage potential interference. In another scenario, the lane change alone, or the speed decrease alone may be performed.

7. Encouraging Interfering Vehicle to Leave the Gap

Figures 7A, 7B:
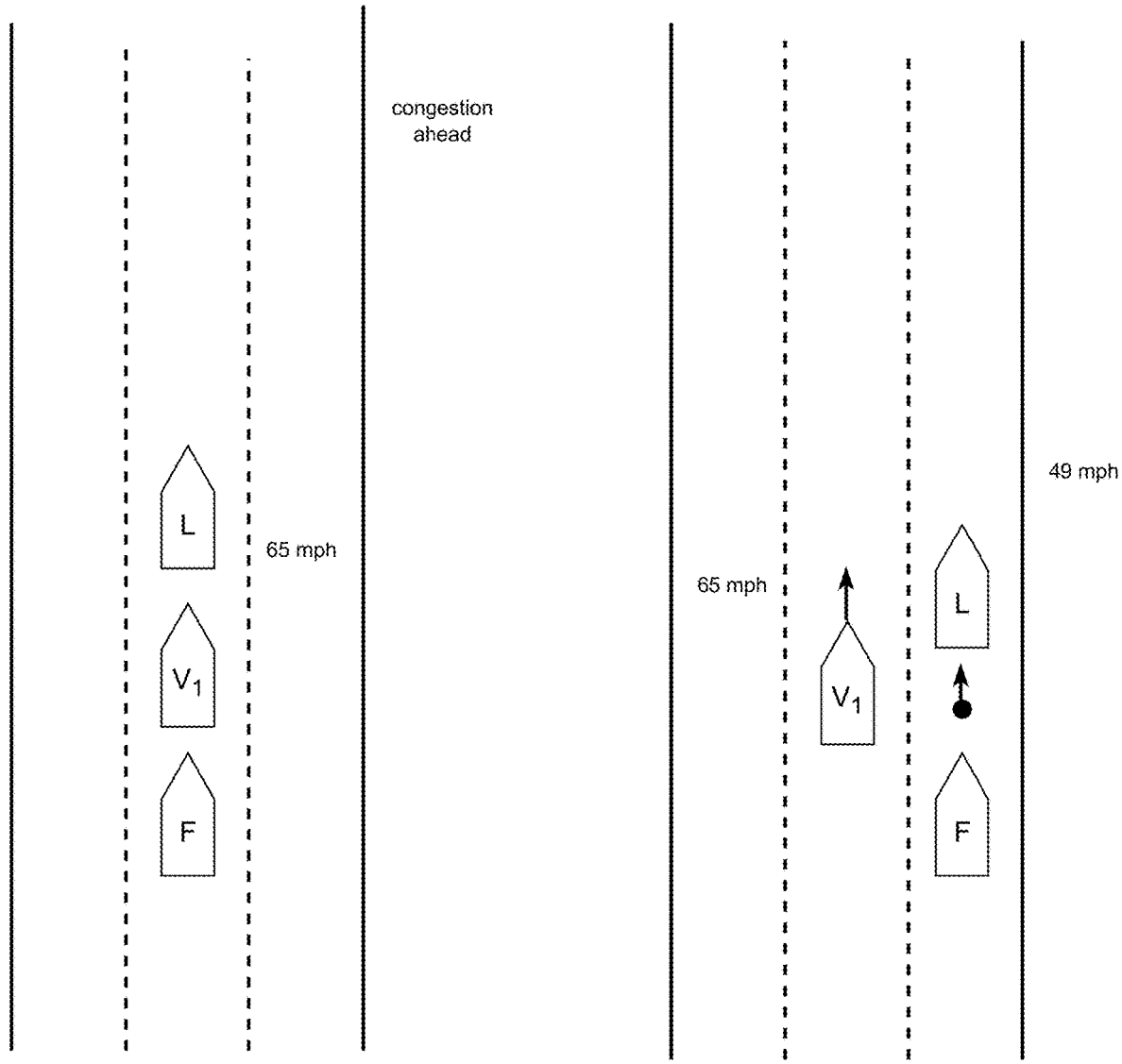
FIGS. 7A to 7B illustrate encouraging a vehicle who has cut-in to vacate the space between platooning vehicles.

FIGS. 7A to 7B illustrate encouraging a vehicle who has cut-in to vacate the space between platooning vehicles. In this example, vehicle V1 has managed to cut-in to the platoon and position itself between L and F. All three vehicles are in the center lane travelling at 65 mph. The platoon logic detects this condition and moves both L and F to the right lane, coordinating the maneuver to avoid collision with V1. The move to the right lane may also be accompanied by a change in cadence such that the speed of the gap at 49 mph is now much less than V1's 65 mph. In another scenario, the lane change alone, or the speed decrease alone may be performed.

8. Discouraging Tailgating

Figures 8A, 8B, 8C:
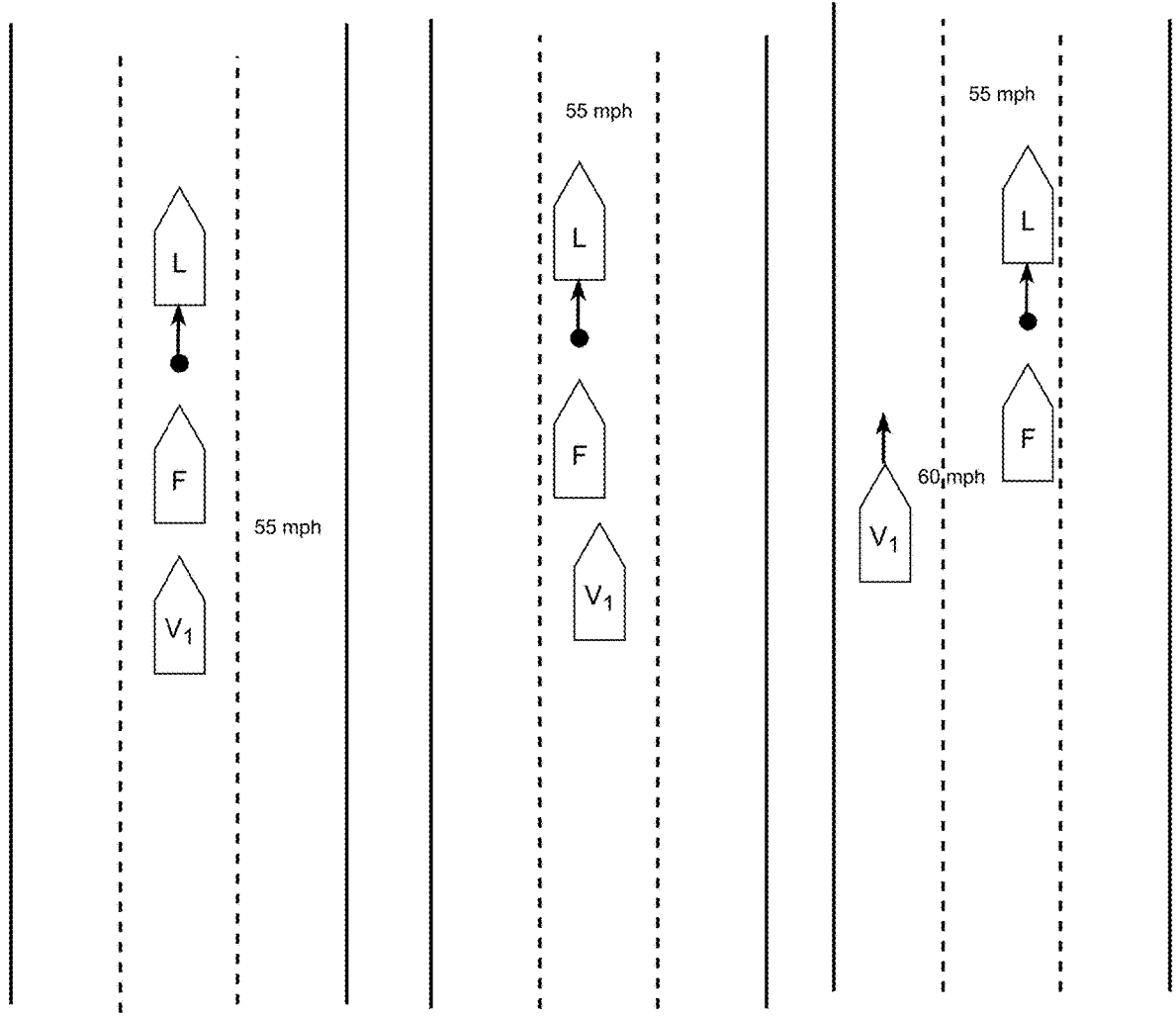
FIGS. 8A to 8C illustrate an example maneuver that may discourage tailgating.

FIGS. 8A to 8C illustrate an example maneuver that may discourage tailgating. In FIG. 8A, the other vehicle V1 has been detected as traveling too close to the following vehicle F. There is no other apparent reason for following closely as there is no congestion or upcoming exit. In the state of FIG. 8B, the platoon starts to shift back and forth but remaining within its lane. This wiggling back and forth in the lane may then encourage vehicle V1 to speed up and pass the platoon as per FIG. 8C.

9. Spacing the Platoon Away from the Other Vehicle

FIGS. 9A to 9D illustrate an example where the platoon shifts to a different lane or possibly also increases cadence to discourage interference. In another scenario, the lane change alone, or the increase in cadence alone may be performed.

Figures 9A, 9B:
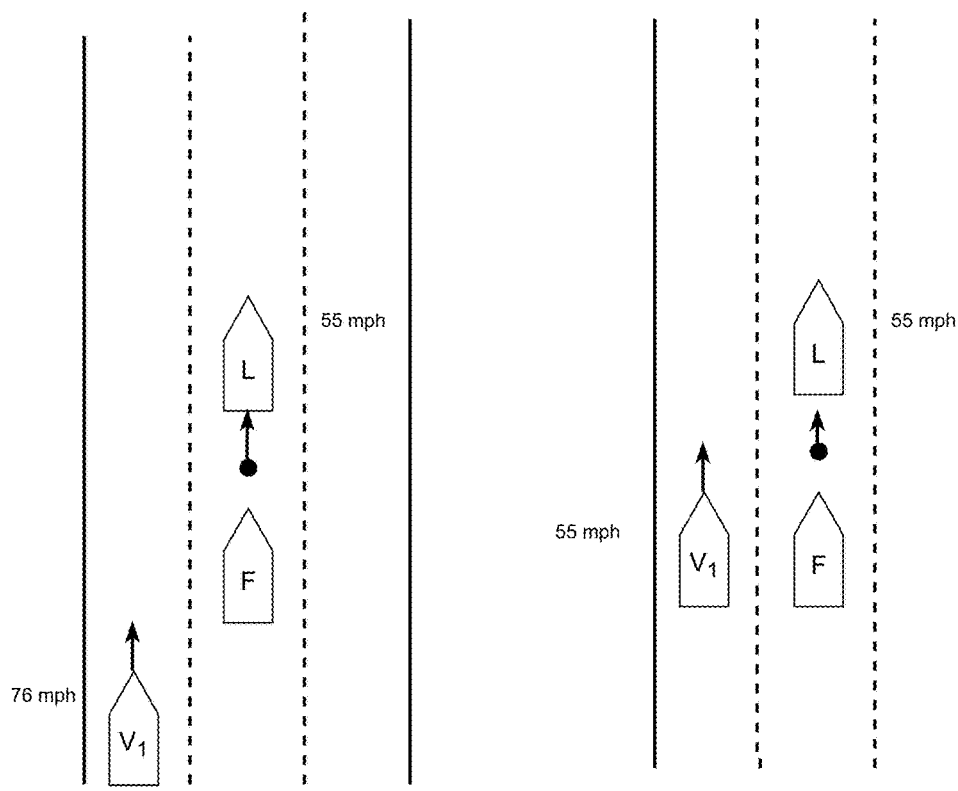
FIGS. 9A to 9D illustrate an example where the platoon shifts to a different lane to discourage interference.
Figures 9C, 9D:
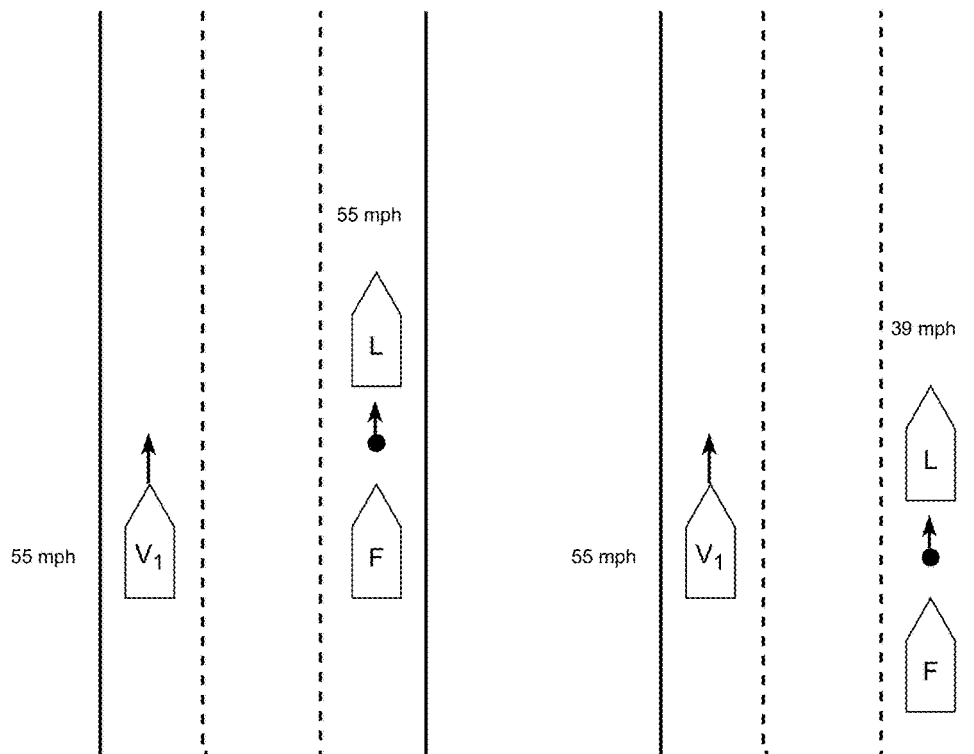

In FIG. 9A the platoon is traveling in the center lane at 55 mph. A potentially interfering vehicle V1 is detected, initially approaching at a higher speed. At FIG. 9B, vehicle V1 has now slowed, thereby reducing the cadence of the gap. There is no other apparent reason for vehicle V1 to slow. The perception logic or human determines this condition. In FIG. 9C, the platoon control logic moves both L and F to the right lane to discourage interference. Alternatively, in FIG. 9D, the platoon logic moves both L and F to the right lane and also reduces its speed, thereby increasing cadence to discourage interference.

10. Platoon Increases Speed to Place Other 4th Vehicle Near the Gap

FIGS. 10A to 10D illustrate how the platoon may increase speed to place vehicles parallel or near the gap to discourage interference by a fourth vehicle.

Figures 10A, 10B:
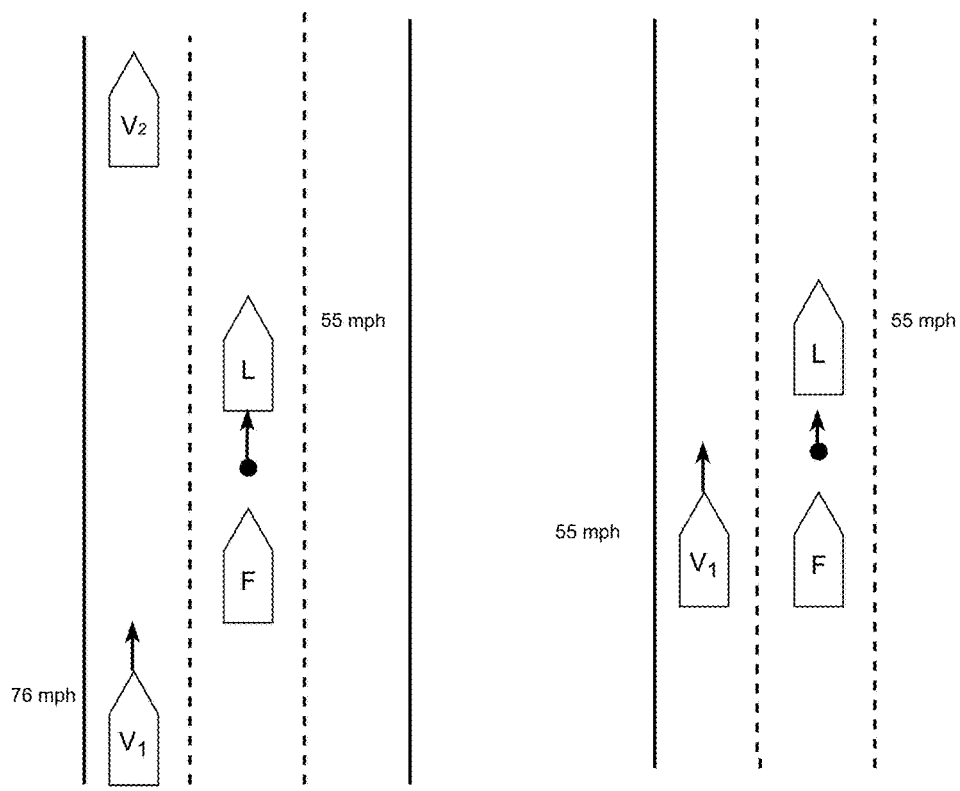
FIGS. 10A to 10D illustrate how the platoon may increase speed to place vehicles parallel or near the gap to discourage interference.
Figures 10C, 10D:
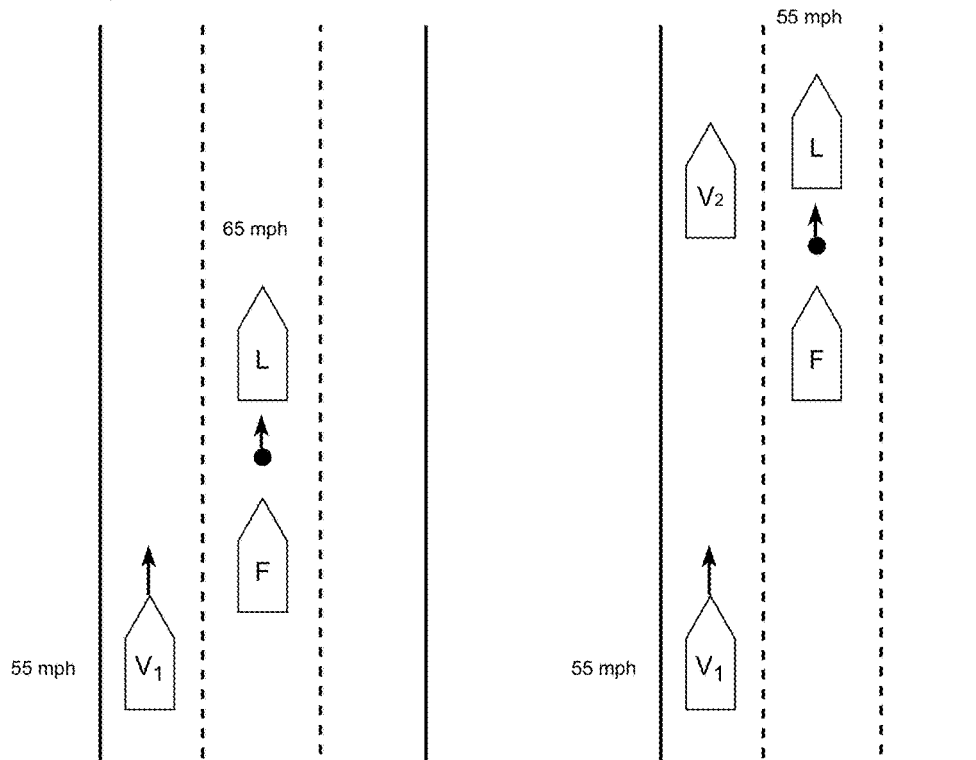

In FIG. 10A the platoon, traveling in the center lane at 55 mph, detects vehicle V1, initially approaching at a higher speed. At FIG. 10B, vehicle V1 has slowed, thereby reducing the cadence of the gap. There is no other apparent reason for vehicle V1 to slow. The platoon logic detects this condition. In FIG. 10C, the platoon logic increases speed in order to move the gap alongside vehicle V2, or nearly so, to the degree necessary to prevent V1 from interfering. In FIG. 10D, the platoon logic reduces its speed at the appropriate time to match that of V2, to discourage interference by V1.

11. Platoon Places Potential Intruder Ahead of or Behind Platoon

Figures 11A, 11B:
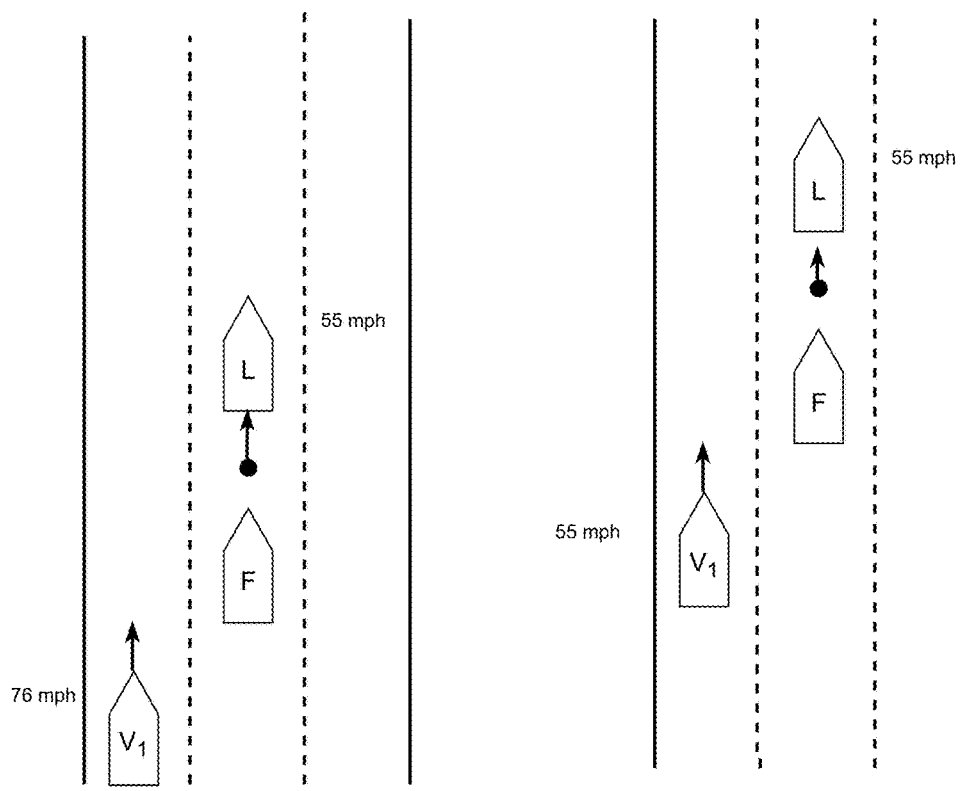
FIGS. 11A to 11D show an example where the platoon may temporarily increase or decrease speed and then change lanes to place the other vehicle behind or ahead respectively.
Figures 11C, 11D:
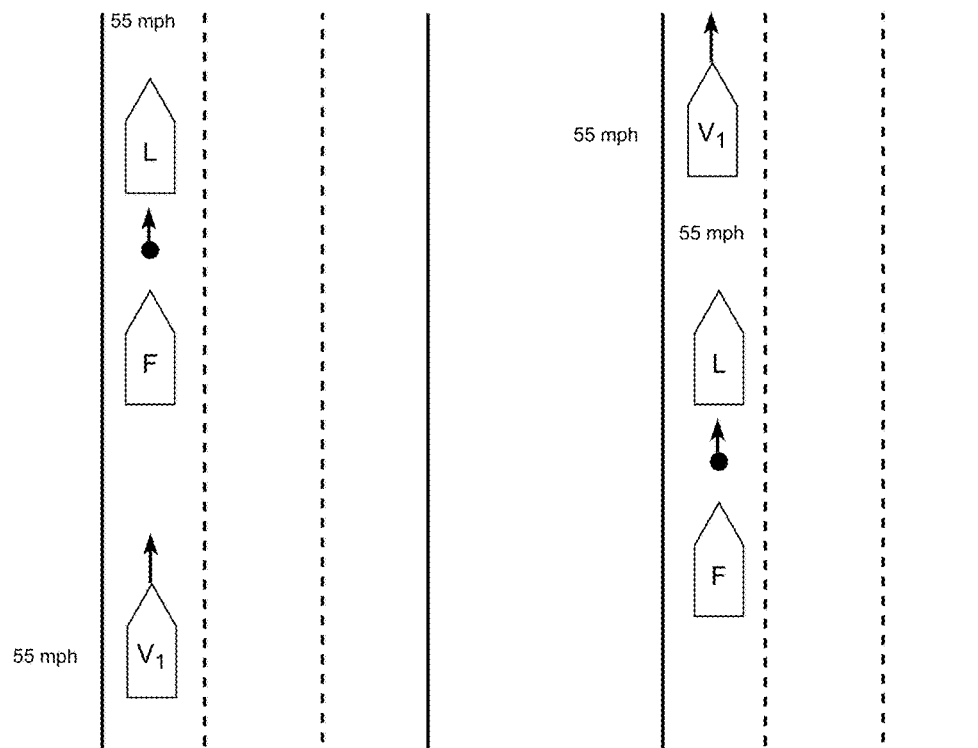

FIGS. 11A to 11D show an example where the platoon may temporarily increase or decrease speed to place the other vehicle behind or ahead of the platoon respectively. In FIG. 11A the platoon is traveling in the center lane at 55 mph. The perception logic and/or human detects vehicle V1, initially approaching at a higher speed. At FIG. 11B, vehicle V1 has slowed, thereby reducing the cadence of the gap. There is no other apparent reason for vehicle V1 to slow. The perception logic or human detects and reports this condition. In FIG. 11C, the platoon logic has completed a maneuver to increase speed and then change into the left lane to place V1 behind itself and thereby prevent V1 from interfering. Alternatively, In FIG. 11D, the platoon logic has completed a maneuver to decrease speed and then change into the left lane to place V1 ahead of itself and thereby prevent V1 from interfering 12. Platoon Nudges Toward Other Vehicle FIGS. 12A and 12B show how the platoon may nudge in lane towards the other vehicle to discourage intrusion or encourage the other vehicle to move away.

Figure 12A:
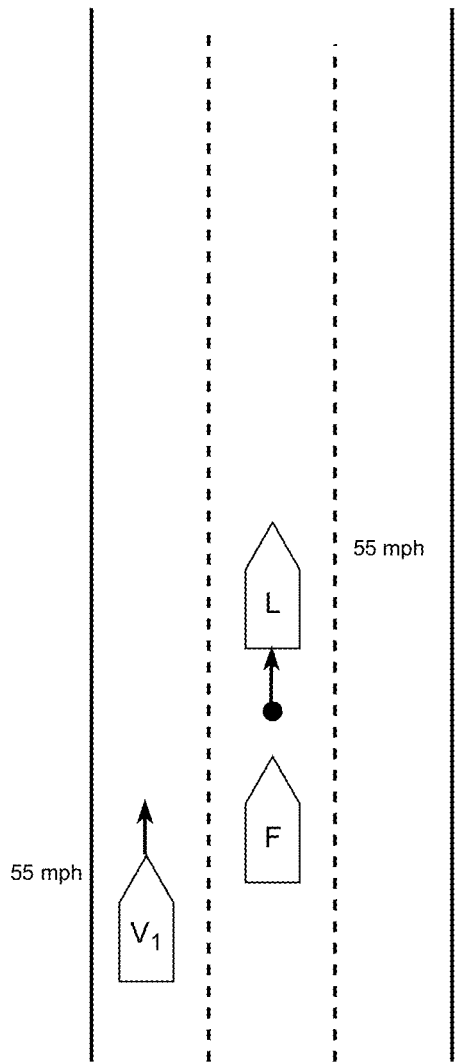
FIGS. 12A and 12B show how the platoon may nudge in lane towards the other vehicle to encourage the other vehicle to move away.
Figure 12B:
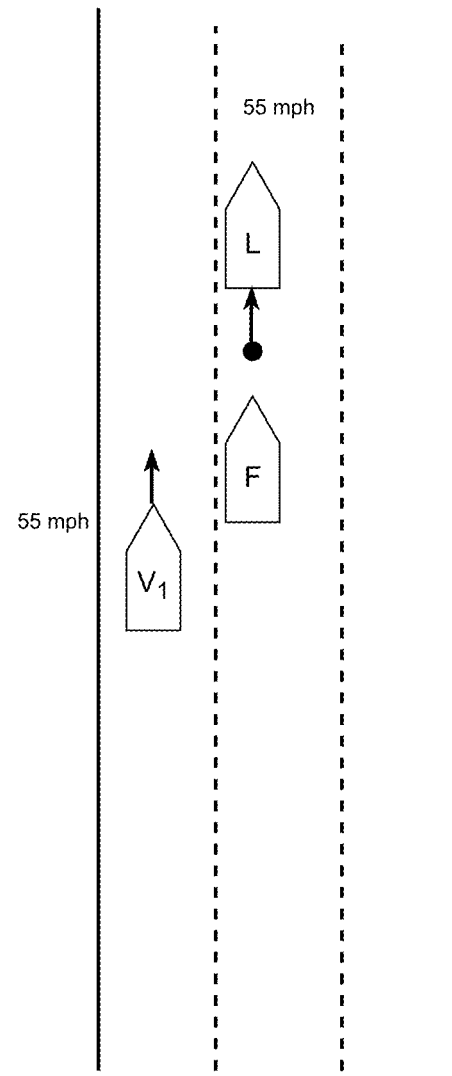

In FIG. 12A the platoon, traveling in the center lane at 55 mph, detects that vehicle V1, initially approaching at a higher speed, has slowed, thereby reducing the cadence of the gap. There is no other apparent reason for vehicle V1 to slow. The perception logic detects this condition. At FIG. 12B, the platoon logic maneuvers toward V1 while remaining in its lane, thereby discouraging V1 from interfering.

13. Platoon Nudges Away from Other Vehicle

Figure 13A:
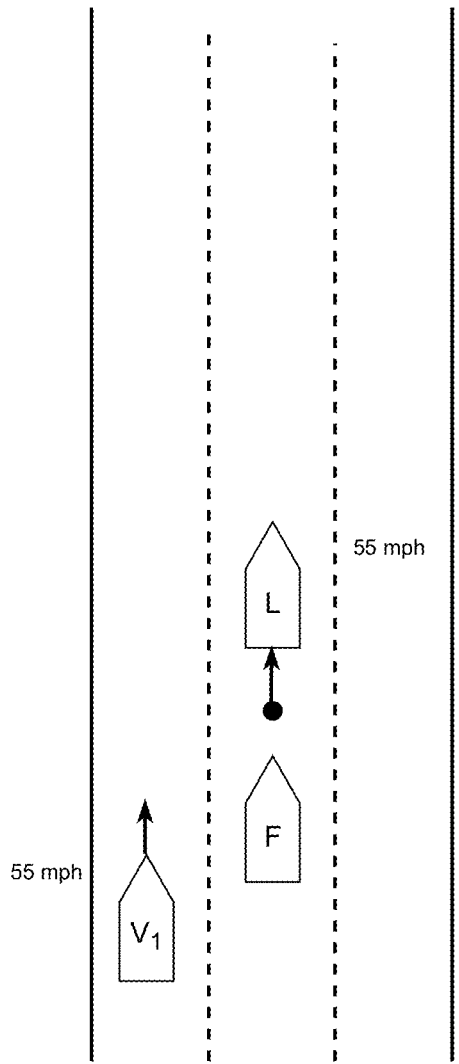
FIGS. 13A and 13B show how the platoon may nudge in lane away from the other vehicle to discourage intrusion.
Figure 13B:
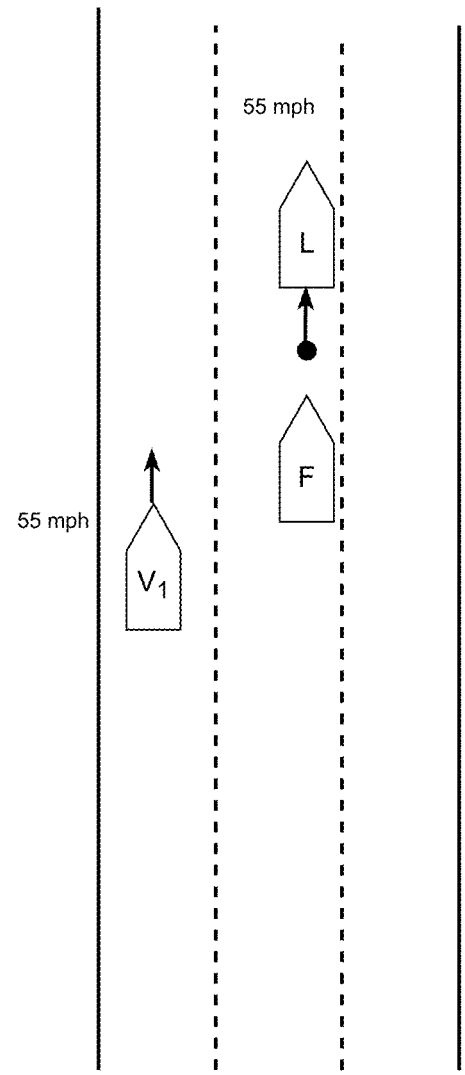

FIGS. 13A and 13B show how the platoon may nudge in lane away from the other vehicle to discourage intrusion.

In FIG. 13A the platoon, traveling in the center lane at 55 mph, detects that vehicle V1, initially approaching at a higher speed, has slowed, thereby reducing the cadence of the gap. There is no other apparent reason for vehicle V1 to slow. The perception logic or human detects this condition. At FIG. 13B, the platoon logic maneuvers away from V1 while remaining in its lane, thereby discouraging V1 from interfering.

14. Platoon Nudges in Lane to Encourage Overtaking to Exit

FIGS. 14A and 14B show how the platoon may nudge in lane away from the other vehicle to suggest an intent to exit in order to discourage intrusion.

In FIG. 14A the platoon, traveling in the center lane at 55 mph, detects that vehicle V1, initially approaching at a higher speed, has slowed, thereby reducing the cadence of the gap. There is no other apparent reason for vehicle V1 to slow. The perception logic or human detects and reports this condition. The platoon logic also detects that an exit is approaching to the right. At FIG. 14B, the platoon logic maneuvers to its right, away from V1 while remaining in its lane, thereby suggesting an intent to exit the highway and thereby discouraging V1 from interfering.

The above figures thus describe several different scenarios where the platoon vehicles maneuver to discourage or encourage determined behaviors by vehicles who are not part of the platoon. It should be understood that various combination of these or other maneuvers may accomplish the same objective.

15. Implementation Details and Options

Figure 15:
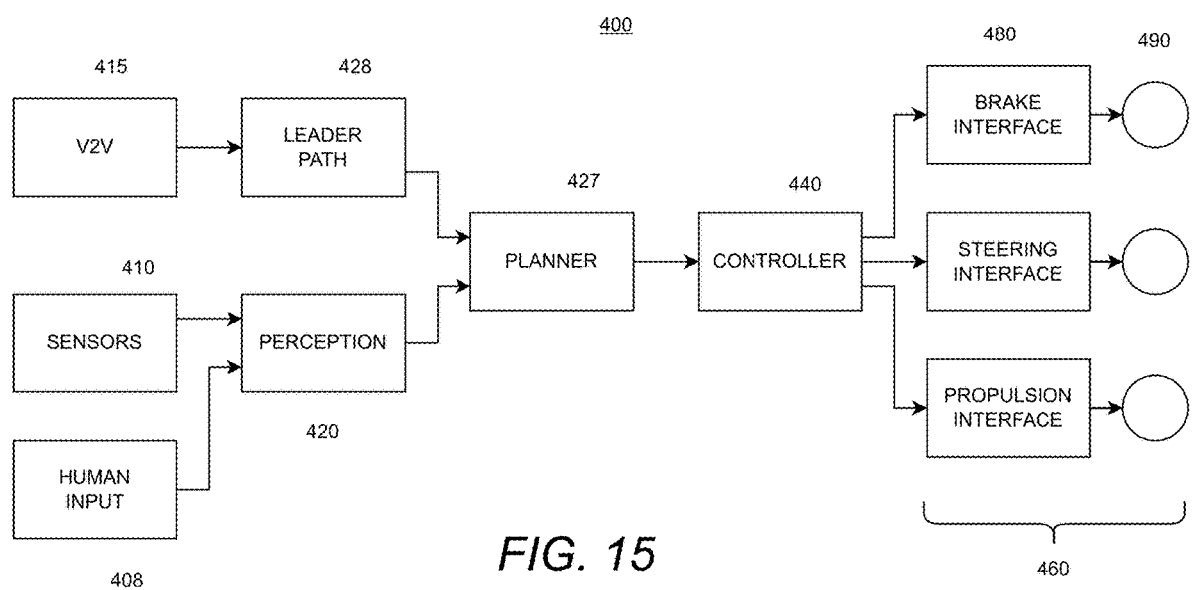
FIG. 15 is an example block diagram of the components of a system that implements the methods and apparatus described herein.

As was mentioned briefly above, FIG. 15 is an example schematic diagram of certain components of an autonomous vehicle, such as a semi-truck. The semi-truck can include a tractor and an associated trailer. Electronics 400 located in the tractor and/or trailer include one or more sensors 410, communications interfaces 415, controllers 440, and interfaces 480 to a drive system.

The sensors 410 can include vision sensors such as cameras, radars, sonars, or LIDARs, speed sensors such as odometers and gyroscopes, and other sensors. Some vision sensors will have fields of view that encompass a region in front of the autonomous truck, and other vision sensors may have fields of view that encompass side regions extending laterally from each side of the tractor or of a trailer coupled to the tractor. Still other sensors may point downward to view lane markings or other indications of the lateral extent of a road surface and/or the region that constitutes the intended lane of travel.

Other electronics in the autonomous follower may include one or more computers. The computer(s) process data received from the sensors 410, implement or use perception logic 420 to determine one or more conditions, and implement or execute planner logic 427 depending on those conditions. In some embodiments, a human 408 such as a driver or passenger in one of the platoon vehicles may also detect conditions and provide these as inputs to the planning logic 427. The planner logic 4270 in turn generates control signals that are fed to the controller logic 440. The controller logic 440 in turn generates control signals that are fed to interfaces 180 that operate the drive system include braking, steering, and propulsion interfaces.

Radio transceivers that transmit and receive data via wireless interfaces, such as a vehicle-to-vehicle (V2V) communication interface 415, may also provide data used in the planner 427 or control logic 440.

For example, a path 428 that the leader is following may be transmitted by the leader to the follower over the V2V interface 115.

Likewise, a path 428 that the follower is travelling may be sent by the follower to the leader over the V2V 115.

In a further example, a desired gap distance 429 to be maintained may be transmitted from the leader to the follower over the V2V interface 115.

The drive system 490 includes at least acceleration (or throttle), braking, and steering mechanisms that respond to electrical control signal inputs provided by the control logic 440.

As used herein, the computers can include a programmable data processing device corresponding to one or more processors, central processing units, graphics processing units, digital signal processors (DSPs), application-specific integrated circuits (ASICs), field-programmable gate arrays (FPGAs)), and/or custom designed hardware. In some configurations, methods performed by the computer(s) and/or the apparatus provided by the computers are instantiated via execution of special purpose software program code, e.g., execution of computer-readable instructions. These instructions can be stored in one or more memory resources of the computing device. The program code can include a program, a subroutine, a portion of a program, a software component and/or a specialized hardware component capable of performing one or more stated tasks or functions. A module or component can exist in memory or on a hardware component independently of other modules or components. Alternatively, a module or component can be a shared element or process of other modules, programs or machines.

The planner receives data from the sensors 410, the perception logic 420, a human driver or passenger, and/or the V2V interface 415 to determine actions which are to be performed by the autonomous follower 102 in order for it to continue on the selected route to a destination.

As explained elsewhere in this document, the perception logic 420 and/or planner 427 may be uniquely configured based on a set of sensors 410 and/or human inputs 408 and the desired constraints that permit the follower 102 to travel along the same path as the leader 103 while also observing lane markings, or to also mimic the leader's lane-center offset during lane changes, to maintain the desired gap velocity with respect to some other vehicle, or to perform some other maneuver that discourages interference with the platoon.

In some examples, sensor logic (not shown) can fuse the sensor data output by multiple sensors 410 before it is provided to the perception logic 420.

The perception logic 420 receives inputs from the sensors 410 and performs functions such as object detection and classification, detection of potentially interfering vehicles, or leader path determination, and/or leader path prediction. Object detection and classification may use image processing to detect lane markings, or the presence of an interfering vehicle, or obstructions such as animals crossing the road. The leader's path may be transmitted from the leader to the follower, or determined by the perception logic, such as by comparing successive images of the rear of a leader vehicle and using 3D image processing techniques to derive a sequence of poses of the leader. Some example methods to determine and follow a leader's path are described in the co-pending U.S. patent application Ser. No. 17/071,156 filed on Oct. 15, 2020 entitled "VISION-BASED FOLLOW THE LEADER LATERAL CONTROLLER".

The perception logic 420 can be specific in terms of identifying, for example, any one or more of a driving lane that the autonomous follower is using, its distance from an edge of a lane or edge of the road, and/or a distance of travel from a point of reference provided by the leader.

The perception logic 420 may generate a perception output that identifies information about moving objects, such as a classification of a moving object such as an interfering vehicle 180 or a second leader 130-2. The perception logic 420 may, for example, identify each of the classified objects of interest from the fused sensor view, such as dynamic objects in the environment, state information associated with individual objects (e.g., whether object is moving, a pose of object, or a direction of the object), and/or a predicted trajectory of each dynamic object.

The perception output can be processed by the controller 140 such as to generate an alert that causes a trajectory being followed by the follower to be altered.

Interfaces 480 enable control of the individual mechanical elements 490 of the drive system. These can include interfaces to electrically (or through programming) control a propulsion component (e.g., a gas pedal or electric motor torque control, a steering interface for a steering mechanism, a braking interface for braking subsystem, etc. The commands can include trajectory inputs (e.g., steer, propel, brake) and one or more other ways to specify an operational state of the autonomous truck (e.g., desired speed and pose, acceleration, etc.).

The control logic 440 may additionally receive inputs from motion sensors 110 (e.g. odometer for measuring speed or gyroscope for measuring turn rate). It may perform functions such as feedback control that monitor the difference between desired and measured motions and adjust the control signals fed to the drive system in order to remove any errors.

By way of example, the commands generated from the control system 440 can specify a relative or absolute position along a road segment at which the autonomous follower is to occupy at a certain time and while in motion (e.g., its lateral position with respect to the current lane, or the longitudinal gap from the leader). The commands can specify a speed, a change in acceleration (or deceleration) from braking or accelerating, a turning action, etc. The controllers translate the commands into control signals for a corresponding mechanical interface; control signals can take the form of analog or digital electrical signals which correlate to the magnitude, duration, frequency or pulse, or other electrical characteristics.

In some implementations, information from the sensors 410, perception 420, path 428 and planner 427 may be stored in a Shared World Model (SWM) 450. The SWM is then shared with other vehicles in the platoon. The SWM may be used by the vehicles to improve their ability to detect other vehicles, objects, lane markings, and the like. An example implementation of a SWM is described in our co-pending U.S. Patent Publication 2022/0198936 entitled "Shared Control for Vehicles Travelling in Formation" filed Oct. 22, 2021 the entire contents of which are hereby incorporated by reference.

16. Example Behavior Flows

Figure 16:
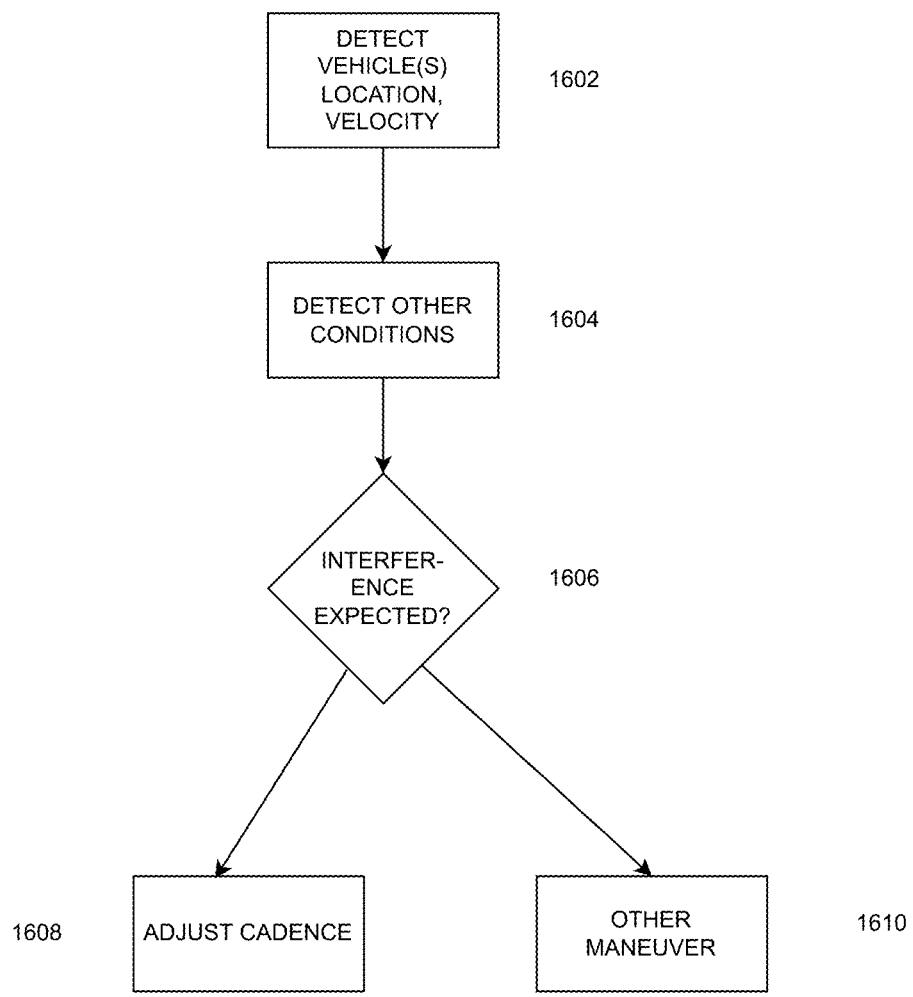
FIG. 16 is an example logical flow for behaviors that discourage interference by other vehicles.

FIG. 16 is one example of a flow that may be implemented by the planner 427 and/or controller 140. In state 1602, the position and velocity of other vehicles V1, V2, V3 etc. are determined, such as from sensor inputs. State 1604 detects other conditions such as the presence of an upcoming exit, or slowing traffic ahead, or an emergency vehicle approaching from behind.

In state 1606, a determination is made as to whether interference by another vehicle V1 is possible. This state can be determined by perception logic, from inputs provided by a human driver, or some combination of such inputs. Here is where the presence of scenarios depicted in the foregoing figures may be detected. Perhaps the situation is as in FIG. 2A, where V1 is travelling much faster than the platoon (high cadence) in a higher speed lane, and there is no exit or traffic ahead. Thus, interference is unlikely. Or perhaps such as per FIG. 9B, V1 has slowed to match the velocity of the gap (low or zero cadence), and with no exit or traffic ahead, the conclusion is interference is likely.

From state 1606, one or more responsive behaviors may then be engaged in by the platoon. For example, in state 1608 the velocity of the gap may changed with respect to the other vehicle (e.g., a change in cadence), under control of the autonomy logic. Or some other maneuver (such as a lane change) may be performed in state 1610. Note also that both a change in cadence 1608 and some other maneuver 1610 may be the appropriate response.

Because behaviors such as changing velocity or changing lanes typically have memory, often called "state", the implementation of a switch in behaviors will often require or benefit if both the old and the new behaviors are active for some period of time to render the transition smooth. For example, if conditions indicate slowing or increasing the speed of the gap, a transition period can be used to avoid a jump in the signals sent to a braking or propulsion actuator. Changes in behavior activation may be initiated and enacted unilaterally under certain conditions where the system designers or human operators deem it to be the safest alternative or for other reasons.

In one alternative design where a human driver is present in the leader, the judgement of the human leader driver in detecting conditions or controlling the platoon behavior may have the highest priority. A human may need to be able to determine if another vehicle is a potential or actual interference, or veto a decision to slow or speed up the gap, such as in the case where the follower is in a failure mode rendering it incompetent. Such a human input would permit the follower to be forced to cross the painted line defining the boundary of the shoulder and come to a stop on the shoulder.

17. Other Observations

The above description contains several example embodiments. It should be understood that while a particular feature may have been disclosed above with respect to only one of several embodiments, that particular feature may be combined with one or more other features of the other embodiments as may be desired and advantageous for any given or particular application. It is, of course, not possible to describe every conceivable combination of components or methodologies for purposes of describing the innovations herein, and one skill in the art may now, in light of the above description, recognize that many further combinations and permutations are possible. Also, to the extent that the terms "includes," and "including" and variants thereof are used in either the detailed description or the claims, these terms are intended to be inclusive in a manner similar to the term "comprising".

It also should be understood that the block and flow diagrams may include more or fewer elements, be arranged differently, or be represented differently. The computing devices, processors, controllers, firmware, software, routines, or instructions as described herein may also perform only certain selected actions and/or functions. Therefore, it will be appreciated that any such descriptions that designate one or more such components as providing only certain functions are merely for convenience.

While a series of steps has been described above with respect to the flow diagrams, the order of the steps may be modified in other implementations. In addition, the operations and steps may be performed by additional or other modules or entities, which may be combined or separated to form other modules or entities. For example, while a series of steps has been described with regard to certain figures, the order of the steps may be modified in other implementations consistent with the principles explained herein. Further, non-dependent steps may be performed in parallel. Further, disclosed implementations may not be limited to any specific combination of hardware.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Accordingly, the subject matter covered by this patent is intended to embrace all such alterations, modifications, equivalents, and variations that fall within the spirit and scope of the claims that follow.

The invention claimed is:

1. A method of operating platoon vehicles to discourage interference by another vehicle that is not a platoon vehicle, the platoon vehicles including a leader and a follower, the method performed by a system comprising one or more processors and one or more computer readable media including instructions that, when executed by the one or more processors, cause the system to execute the method, the method comprising:
   determining a velocity of a point associated with a gap between the platoon vehicles. wherein the point is a predetermined point within a space between a leader vehicle and a follower vehicle in the platoon;
   determining a velocity of the other vehicle;
   detecting, based at least in part on the velocity of the point associated with the gap and on the velocity of the other vehicle, an interference state where the other vehicle may potentially interfere or has interfered with the platoon;
   determining that no justification for a maneuver to interfere is present; and
   in accordance with the determination that no justification is present, performing a maneuver to discourage the other vehicle from interfering, wherein the maneuver to discourage the other vehicle from interfering comprises adjusting a lateral lane position without changing lanes of at least one vehicle in the platoon.

2. The method of claim 1, wherein the maneuver further comprises:
   if no justification is present, then changing the velocity of the point associated with the gap with respect to the other vehicle to discourage the other vehicle from interfering.

3. The method of claim 2, wherein changing the velocity of the point associated with the gap involves slowing the velocity of the point associated with the gap speed relative to the other vehicle.

4. The method of claim 2, wherein changing the velocity of the point associated with the gap involves speeding up the velocity of the point associated with the gap relative to the other vehicle.

5. The method of claim 1, additionally comprising:
   if no justification is present, then maintaining the velocity of the point associated with the gap with respect to the other vehicle.

6. The method of claim 1, wherein the interference state is the other vehicle slowing to match the velocity of the point associated with the gap.

7. The method of claim 1, wherein the interference state is other traffic slowing ahead of the platoon.

8. The method of claim 1, wherein the interference state is an exit ramp ahead of the platoon.

9. The method of claim 1, wherein the interference state is an open road ahead and the other vehicle slowing or changing lanes to match the velocity of the point associated with the gap or lane placement of the platoon vehicles.

10. The method of claim 1, wherein the interference state is the other vehicle appearing to want to take an exit ramp.

11. The method of claim 1, wherein the maneuver performed by the platoon additionally comprises one or more of:
   opening the gap;
   closing the gap;
   placing the gap adjacent to a fourth vehicle travelling in another lane;
   changing lanes;
   speeding up;
   slowing down; and/or
   shifting within lane.

12. The method of claim 1, wherein the interference state is one or more other vehicles approaching the platoon while driving erratically.

13. The method of claim 1, wherein adjusting a lateral lane position without changing lanes of at least one vehicle in the platoon comprises the at least one vehicle in the platoon moving towards the other vehicle while remaining in the lane.

14. The method of claim 1, wherein adjusting a lateral lane position without changing lanes of at least one vehicle in the platoon comprises the at least one vehicle in the platoon moving away from the other vehicle while remaining in the lane.

15. An apparatus configured for operating platoon vehicles to discourage interference by another vehicle that is not a platoon vehicle, the platoon vehicles including a leader and a follower, the apparatus comprising:

one or more processors; and one or more computer readable media including instructions that, when executed by the one or more processors, are arranged to cause the one or more processors to perform a process for:

determining a velocity of a point associated with a gap between the platoon vehicles, wherein the point is a predetermined point within a space between a leader vehicle and a follower vehicle in the platoon;

determining a velocity of the other vehicle;

detecting, based at least in part on the velocity of the point associated with the gap and on the velocity of the other vehicle, an interference state where the other vehicle may interfere or has interfered with the platoon;

determining whether justification for the maneuver to interfere is present; and if no justification is present, then performing a maneuver to discourage the other vehicle from interfering, wherein the maneuver to discourage the other vehicle from interfering comprises adjusting a lateral lane position without changing lanes of at least one vehicle in the platoon; and if justification is present, then either (a) taking no action or (b) performing a maneuver to encourage the other vehicle to take some other action.

* * * * *